(12) United States Patent
Andres

(10) Patent No.: US 7,466,045 B2
(45) Date of Patent: Dec. 16, 2008

(54) IN-SHAFT REVERSE BRAYTON CYCLE CRYO-COOLER

(75) Inventor: Michael J. Andres, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 379 days.

(21) Appl. No.: 11/364,906

(22) Filed: Feb. 14, 2006

(65) Prior Publication Data

US 2008/0238222 A1   Oct. 2, 2008

(51) Int. Cl.
    *H02K 9/00* (2006.01)
(52) U.S. Cl. .............................. 310/52; 310/54; 310/59; 310/64
(58) Field of Classification Search ............. 310/52–54, 310/58–59, 61–63, 60 A, 64
    See application file for complete search history.

(56) References Cited

U.S. PATENT DOCUMENTS

| 2,675,493 | A | * | 4/1954 | Grobel | 310/53 |
| 2,970,232 | A | * | 1/1961 | Kilbourne | 310/54 |
| 2,975,308 | A | * | 3/1961 | Kilbourne et al. | 310/54 |
| 3,711,371 | A | * | 1/1973 | Pluschke | 310/53 |
| 3,904,901 | A | * | 9/1975 | Renard et al. | 310/52 |
| 3,922,573 | A | * | 11/1975 | Pluschke | 310/53 |
| 3,934,163 | A | * | 1/1976 | Mailfert | 310/10 |
| 4,216,398 | A | * | 8/1980 | Kullmann | 310/53 |
| 7,061,147 | B2 | * | 6/2006 | Ries | 310/54 |

* cited by examiner

*Primary Examiner*—Thanh Lam
(74) *Attorney, Agent, or Firm*—Stephen G. Mican

(57) ABSTRACT

An in-shaft cryogenic cooler mounts entirely within the shaft of a dynamoelectric machine that has a rotor comprising a high temperature superconductor.

20 Claims, 3 Drawing Sheets ents that it may supply to the rotor. A heat exchanger is located inboard of the rotor, with a compressor and a turbine closely coupled to expand the working fluid to a desired low temperature at the rotor and keep thermal transients low.

IN-SHAFT REVERSE BRAYTON CYCLE CRYO-COOLER

FIELD OF THE INVENTION

The invention generally relates to cooling systems for electrical equipment, and more particularly to cryogenic cooling systems for dynamoelectric machines.

BACKGROUND OF THE INVENTION

There are increasing demands for compact, high-power dynamoelectric machines, both motors and generators, and particularly generators for mobile applications. Superconducting generators become competitive with conventional generators as power demands increase.

Superconducting dynamoelectric machines typically require rotors that comprise high temperature superconductors. Such rotor superconductors require an operating temperature near 30 K for the typical combination of electric current density and magnetic flux density that they support. The most accepted approach for cooling such dynamoelectric machine rotors comprises circulating cold, gaseous helium from an external cryogenic cooler into the rotor. Although this approach may be satisfactory for stationary dynamoelectric machines that operate at relatively low rotational speeds, the use of conventional large external cryogenic coolers for compact mobile applications, and particularly aeronautical applications, are not satisfactory from the standpoint of weight alone. In addition, high-performance, low-temperature rotating seals are required for the entry and exit of helium ports in the dynamoelectric machine shaft. These types of seals are not likely to withstand ordinary dynamoelectric machine service life in aeronautical applications wherein rotational speeds may be near 15,000 rpm.

SUMMARY OF THE INVENTION

The invention comprises an in-shaft cryogenic cooler that mounts entirely within the shaft of a dynamoelectric machine that has a rotor comprising a high temperature superconductor. A miniature in-shaft reverse Brayton cycle cryogenic cooler mounts within the dynamoelectric machine shaft to eliminate any need for coolant entry and exit ports and their associated rotating shaft seals. The in-shaft cooler also enables a lighter weight and more compact installation with reduced parasitic thermal losses.

More specifically, the invention comprises a cryogenic cooler for a dynamoelectric machine that has a superconducting rotor mounted on a dynamoelectric machine shaft and uses a working fluid to cool the rotor, comprising: a cold side heat exchanger mounted proximate the rotor that receives the working fluid and transfers heat $Q_L$ from the rotor to the working fluid and discharges the working fluid at a low pressure $P_L$ into a cold side heat exchanger output path that extends within the dynamoelectric machine shaft; a regenerator mounted within the dynamoelectric machine shaft that receives the low pressure working fluid from the cold side heat exchanger output path and warms the low pressure working fluid with warm working fluid that it receives from a warm side heat exchanger output path that extends within the dynamoelectric machine shaft and discharges the warmed low-pressure working fluid into a low-pressure regenerator output path that extends within the dynamoelectric machine shaft; a compressor mounted within the dynamoelectric machine shaft that receives the warmed low-pressure working fluid from the low-pressure regenerator output path and compresses the working fluid to a high pressure $P_L$ at an elevated temperature and discharges the high-pressure working fluid at an elevated temperature into a compressor output path that extends within the dynamoelectric machine shaft; a warm side heat exchanger mounted within the dynamoelectric machine shaft that receives the high-pressure working fluid at an elevated temperature from the compressor output path and transfers heat $Q_H$ from the working fluid to a warm side heat sink proximate the warm side heat exchanger and discharges the high-pressure cooled working fluid into the warm side heat exchanger output path, wherein the regenerator cools the high-pressure working fluid with the low-pressure working fluid that it receives from the cold side heat exchanger output path and discharges the cooler high pressure working fluid into a high-pressure regenerator output path that extends within the dynamoelectric machine shaft; a turbine mounted within the dynamoelectric machine shaft that receives the cooler high pressure working fluid from the high-pressure regenerator output path to drive the compressor by way of a drive shaft that extends within the dynamoelectric machine shaft and to expand the working fluid to a lowest temperature at the low-pressure $P_L$ and discharges the lowest temperature low-pressure working fluid into a turbine discharge path that extends within the dynamoelectric machine shaft and supplies the cold side heat exchanger with working fluid; and a supplemental motor coupled to the drive shaft that also drives the compressor.

DETAILED DESCRIPTION OF THE INVENTION

The invention comprises a miniature cryogenic cooler, commonly called a cryo-cooler, that mounts entirely within a driveshaft of a dynamoelectric machine that has a rotor that comprises a high temperature superconductor. Regenerative gas cycles, such as the Brayton cycle, Stirling cycle, Vuilleumier cycle and Gifford-McMahon cycle, generally serve as the basis for such cryo-coolers.

The most common cryo-coolers for fixed cooling loads use the Stirling cycle or the Gifford-McMahon cycle. These cycles offer relatively good efficiency and each offer physical advantages, depending on the application. Additionally, either cycle is usable for a laboratory demonstration of a superconducting dynamoelectric machine with suitable rotating cryogenic couplings for the working fluid, which is typically helium.

However, the physical size of the components required for these cycles make it nearly prohibitive to install them within a high-speed dynamoelectric machine shaft. In contrast, the reverse Brayton cycle is ideal for miniaturising associated components for a cryo-cooler according to the invention that mounts entirely within a dynamoelectric machine driveshaft as hereinafter described.

Figure 2:
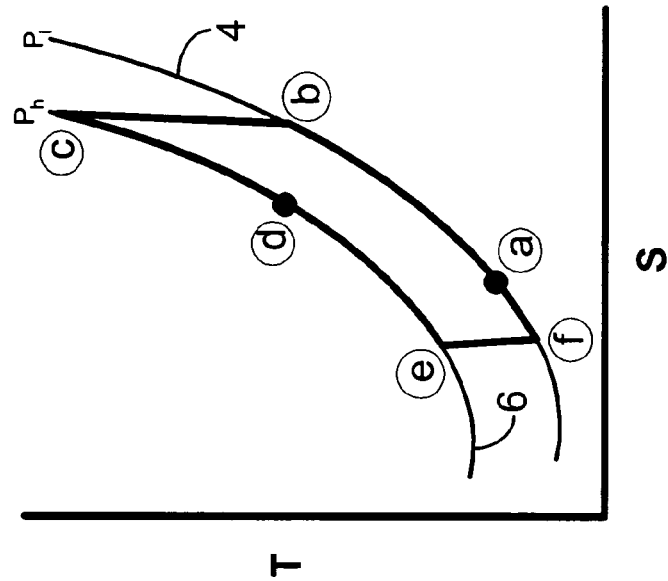
FIG. 2 is a general temperature-entropy diagram for a reverse Brayton cycle applicable to the in-shaft cryogenic cooler according to a possible embodiment of the invention.
Figure 1:
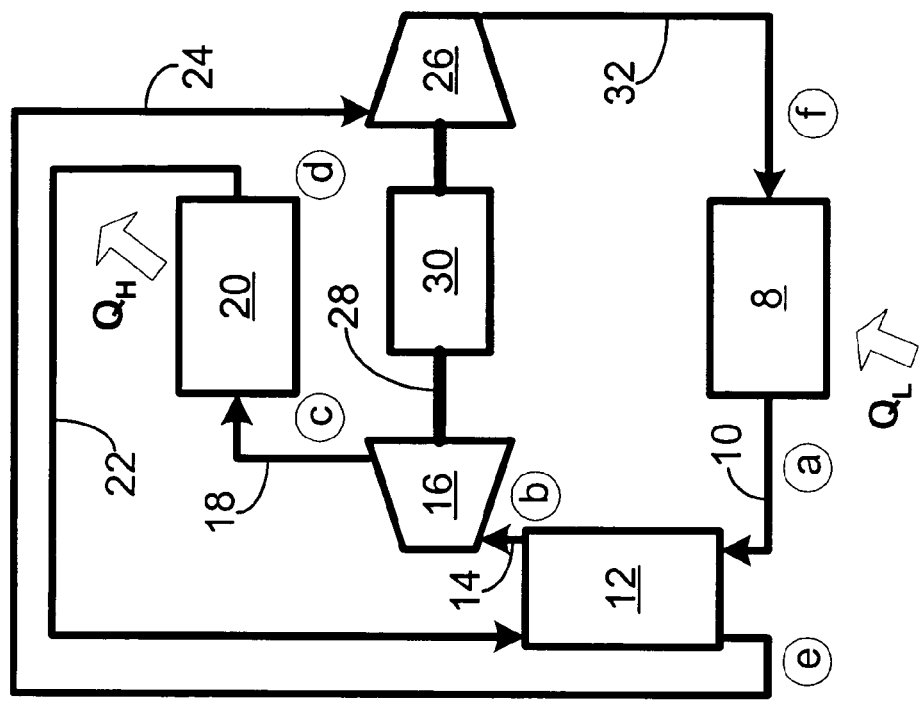
FIG. 1 is a flow schematic for a reverse Brayton cycle applicable to an in-shaft cryogenic cooler according to a possible embodiment of the invention.

FIG. 1 is a flow schematic for a reverse Brayton cycle cooling system 2 usable for an in-shaft cryo-cooler according to a possible embodiment of the invention. FIG. 2 is a general temperature-entropy diagram for a reverse Brayton cycle applicable to the in-shaft cryo-cooler according to a possible embodiment of the invention. By way of example, the temperature-entropy diagram is for a working fluid that comprises helium, although other working fluids may be suitable, as those skilled in the art shall appreciate. Assuming a cooling load of 50 watts, helium gas as a working fluid requires a flow of approximately 0.25 lb/min at a pressure of between 20 and 60 psia. Referring to FIGS. 1 and 2 together, curve 4 represents temperature T of the cycle for the system 2 as a function of entropy S for a low-pressure side of the system 2 at a low pressure $P_L$. Curve 6 represents temperature T of the cycle for the system 2 as a function of entropy S for a high-pressure side of the system 2 at a high pressure $P_H$.

A cold side heat exchanger 8 receives working fluid, such as helium, to transfer heat $Q_L$ from a cold side heat source (not shown), such as a dynamoelectric machine rotor, to the working fluid. The cold side heat exchanger then discharges the working fluid on the low-pressure side of the system 2 at a low temperature and the pressure $P_L$, as represented by point "a" on curve 4, into a cold side heat exchanger output path 10. A regenerator 12 receives the working fluid from the cold side heat exchanger output path 10. The regenerator 12 warms the working fluid to nearly ambient temperature at pressure $P_L$, as represented by point "b" on curve 4, and discharges the working fluid into a low-pressure regenerator output path 14.

A compressor 16 receives the working fluid from the low-pressure regenerator output path 14 to compress the working fluid to the pressure $P_H$. The compressor 16 then discharges the working fluid on the high-pressure side of the system 2 at an elevated temperature and the pressure $P_H$, as represented by point "c" on curve 6, into a compressor discharge path 18. A warm side heat exchanger 20 receives the working fluid from the compressor discharge path 18 to transfer heat $Q_H$ from the working fluid to a warm side heat sink (not shown). The warm side heat exchanger 20 then discharges the working fluid at a lower temperature at the pressure $P_H$, as represented by point "d" along curve 6, into a warm side heat exchanger output path 22.

The regenerator 12 receives the working fluid from the warm side heat exchanger output path 22 to transfer heat to the working fluid that it receives from the cold side heat exchanger output path 10. The regenerator 12 then discharges the working fluid at a lower temperature at the pressure $P_H$, as represented by point "e" on curve 6, into a high-pressure regenerator output path 24.

A turbine 26 receives the working fluid from the high-pressure regenerator output path 24 to drive the compressor 16 by way of a drive shaft 28 with the assistance of a supplemental motor 30, such as another turbine or an electric motor, coupled to the drive shaft 28. The turbine 26 expands the working fluid and discharges it at a lowest temperature at the pressure $P_L$, as represented by point "f" on curve 4, into a turbine discharge path 32. The cold side heat exchanger 8 then receives the working fluid from the turbine discharge path 28 to repeat the cycle.

Figure 3:
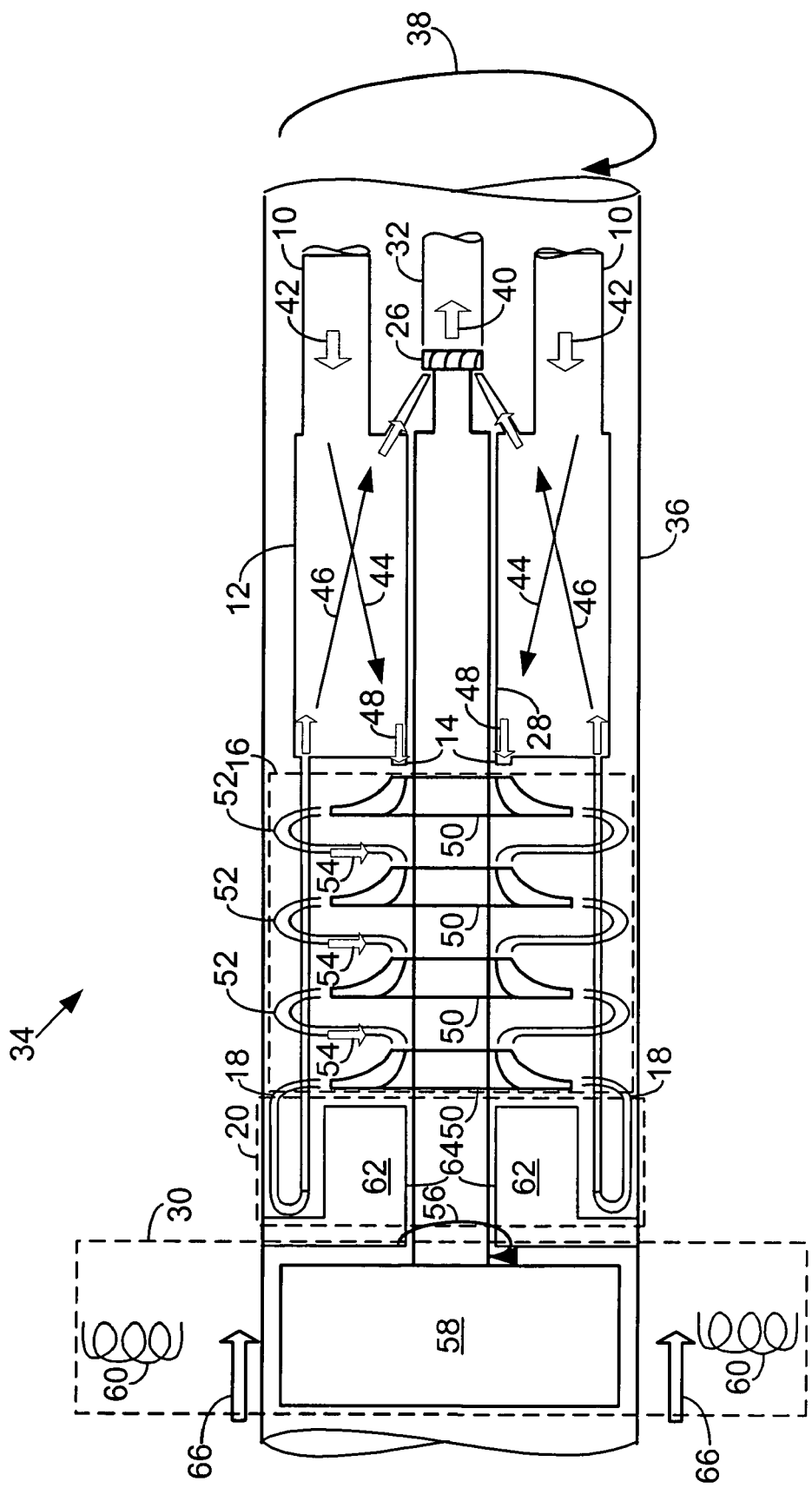
FIG. 3 is an electric motor driven in-shaft reverse Brayton cycle cryogenic cooler according to a possible embodiment of the invention.

FIG. 3 is an electric motor driven in-shaft reverse Brayton cycle cryo-cooler 34 according to a possible embodiment of the invention. A dynamoelectric machine shaft 36 for a superconducting dynamoelectric machine (not shown) serves as a housing for the cryo-cooler 34. The diameter of the shaft 36 may be any appropriate size, and by way of example only, a two-inch diameter shaft 36 may be suitable. Arrow 38 indicates normal rotation of the shaft 36.

Referring to FIGS. 1 and 3 together, cold working fluid from the turbine 26 mounted along the axis of the shaft 36 discharges into the turbine discharge path 32 at low pressure $P_L$ as indicated by arrow 40. By way of example only, for a shaft 36 that has a two-inch diameter, a turbine diameter of approximately 0.4 inches may be suitable. The turbine discharge path 32 follows along the axis of the shaft 36 to couple to the cold side heat exchanger 8 mounted within the shaft 36 proximate a superconducting rotor (not shown) within the superconducting dynamoelectric machine. By way of example, the temperature of the working fluid that the turbine 26 discharges may be approximately 25 K.

The cold side heat exchanger 8 receives the working fluid and transfers heat $Q_L$ from the rotor to the working fluid. The cold side heat exchanger 8 then discharges the working fluid into the cold side heat exchanger output path 10, as indicated by arrows 42. The cold side heat exchanger output path 10 may conveniently be an annular passageway within the shaft 36 that envelops the turbine discharge path 32. By way of example, the temperature of the working fluid that the cold side heat exchanger 8 discharges may be approximately 33 K.

The regenerator 12 receives the working fluid from the cold side heat exchanger output path 10 and warms the working fluid as it passes through the regenerator 12 as indicated by arrows 44 due to absorbing heat from working fluid passing through the regenerator 12 in the opposite direction toward the turbine 26 as indicated by arrows 46. As shown, the regenerator 12 may have an annular cylindrical configuration with an inner surface 48 that serves as a bearing surface for the drive shaft 28. The regenerator 12 then discharges the warmed working fluid into the regenerator low-pressure output path 14 as indicated by arrows 48. By way of example, the temperature of the working fluid that the regenerator 12 discharges into the low-pressure output path 14 may be approximately 272 K.

The compressor 16 receives the working fluid from the low-pressure output path 14 and compresses it to the pressure $P_H$ at an elevated temperature. The compressor 16 may comprise multiple stages of centrifugal compression, such as with four compressor wheels 50 as shown. By way of example only, each compressor wheel 50 may have a diameter of approximately 1.6 inches. Working fluid flows between the compressor wheels 50 in compressor passageways 52 as represented by arrows 54. Arrow 56 indicates the rotation of the compressor 16 as driven by the turbine 26 and the supplemental motor 30, comprising a permanent magnet rotor 58 and stator coils 60 arranged around the shaft 36, through the drive shaft 28.

A bearing 62 that has a generally annular cylindrical configuration and bearing surface 64 may support the end of the drive shaft 28 proximate the supplemental motor 30. As shall be appreciated by those skilled in the art, the compressor 16 may also comprise compressor inter-stage cooling (not shown) to improve cycle efficiency. The compressor 16 then discharges the pressurised working fluid into the By way of example, the temperature of the working fluid that the compressor 16 discharges into the compressor discharge path 18. By way of example, the temperature of the working fluid that the compressor 16 discharges into the compressor discharge path 18 may be approximately 477 K.

The warm side heat exchanger 20 receives the pressurised working fluid from the compressor discharge path 18 and transfers heat $Q_H$ from the working fluid to a heat sink that is external to the shaft 36, such as cooling air as indicated by arrows 66. The warm side heat exchanger 20 then discharges the cooled pressurised working fluid to the warm side heat exchanger output path 22. By way of example, with cooling air that brings the surface of the shaft 36 proximate the warm side heat exchanger 20 to a temperature of approximately 260 K, the temperature of the cooled pressurised working fluid that the warm side heat exchanger 20 discharges into the warm side heat exchanger output path 22 may be approximately 274 K.

The regenerator 12 receives the cooled pressurised working fluid from the warm side heat exchanger output path 22 and cools it still further as it passes through the regenerator 12 as indicated by the arrows 46 due to transferring heat from working fluid passing through the regenerator 12 in the opposite direction toward the compressor 16 as indicated by the arrows 44. The regenerator 12 then discharges the cold pressurised working fluid into the high-pressure regenerator output path 24. By way of example, the temperature of the cold pressurised working fluid that the regenerator 12 discharges into the high-pressure regenerator output path 24 may be approximately 33 K. The turbine 26 then receives the cold working fluid from the high-pressure regenerator output path 24 to expand and further cool the working fluid as hereinbefore described.

Figure 4:
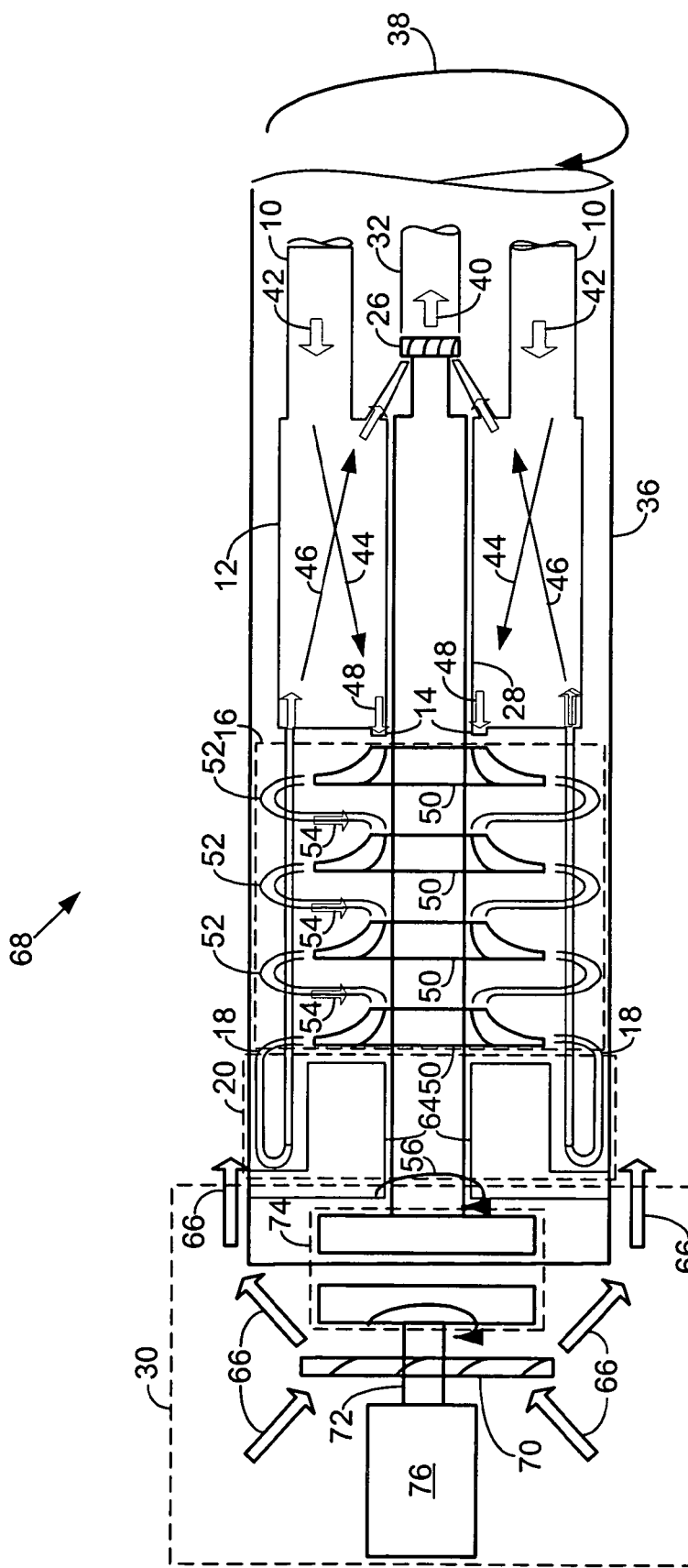
FIG. 4 is a turbine driven in-shaft reverse Brayton cycle cryogenic cooler according to a possible embodiment of the invention.

FIG. 4 is a turbine driven in-shaft reverse Brayton cycle cryo-cooler 68 according to a possible embodiment of the invention. It is much the same as the cryo-cooler 34 hereinbefore described in connection with FIG. 3, but in this case, the supplemental motor 30 comprises an externally driven air turbine 70 driven by the cooling air as indicated by the arrows 66. An air turbine drive shaft 72 couples the air turbine 70 to the drive shaft 28 by way of a magnetic coupling 74. A turbine support bearing 76 supports the air turbine 70 along an end of the air turbine drive shaft 72 opposite the magnetic coupling 74. By way of example, cooling air in the range of 10 to 15 lbm/min at approximately 90-psi supply pressure may be sufficient for driving the air turbine 70.

Hereinbefore described are possible embodiments of an in-shaft cryogenic cooler that mounts entirely within the shaft of a dynamoelectric machine that has a rotor comprising a high temperature superconductor. The described embodiments of the invention are only some illustrative implementations of the invention wherein changes and substitutions of the various parts and arrangement thereof are within the scope of the invention as set forth in the attached claims.

The claimed invention is:

1. A cryogenic cooler for a dynamoelectric machine that has a superconducting rotor mounted on a dynamoelectric machine shaft and uses a working fluid to cool the rotor, comprising:

a cold side heat exchanger mounted proximate the rotor that receives the working fluid and transfers heat $Q_L$ from the rotor to the working fluid and discharges the working fluid at a low pressure $P_L$ into a cold side heat exchanger output path that extends within the dynamoelectric machine shaft;

a regenerator mounted within the dynamoelectric machine shaft that receives the low pressure working fluid from the cold side heat exchanger output path and warms the low pressure working fluid with warm working fluid that it receives from a warm side heat exchanger output path that extends within the dynamoelectric machine shaft and discharges the warmed low-pressure working fluid into a low-pressure regenerator output path that extends within the dynamoelectric machine shaft;

a compressor mounted within the dynamoelectric machine shaft that receives the warmed low-pressure working fluid from the low-pressure regenerator output path and compresses the working fluid to a high pressure $P_L$ at an elevated temperature and discharges the high-pressure working fluid at an elevated temperature into a compressor output path that extends within the dynamoelectric machine shaft;

a warm side heat exchanger mounted within the dynamoelectric machine shaft that receives the high-pressure working fluid at an elevated temperature from the compressor output path and transfers heat $Q_H$ from the working fluid to a warm side heat sink proximate the warm side heat exchanger and discharges the high-pressure cooled working fluid into the warm side heat exchanger output path, wherein the regenerator cools the high-pressure working fluid with the low-pressure working fluid that it receives from the cold side heat exchanger output path and discharges the cooler high pressure working fluid into a high-pressure regenerator output path that extends within the dynamoelectric machine shaft;

a turbine mounted within the dynamoelectric machine shaft that receives the cooler high pressure working fluid from the high-pressure regenerator output path to drive the compressor by way of a drive shaft that extends within the dynamoelectric machine shaft and to expand the working fluid to a lowest temperature at the low-pressure $P_L$ and discharges the lowest temperature low-pressure working fluid into a turbine discharge path that extends within the dynamoelectric machine shaft and supplies the cold side heat exchanger with working fluid; and a supplemental motor coupled to the drive shaft that also drives the compressor.

2. The cryogenic cooler of claim 1, wherein the cooler uses a reverse Brayton cycle.

3. The cryogenic cooler of claim 1, wherein the cooler uses helium as the working fluid.

4. The cryogenic cooler of claim 1, wherein the warm side heat sink comprises cooling air.

5. The cryogenic cooler of claim 1, wherein the supplemental motor comprises an electric motor.

6. The cryogenic cooler of claim 1, wherein the supplemental motor comprises an air turbine driven by cooling air.

7. The cryogenic cooler of claim 1, wherein the dynamoelectric machine comprises a generator.

8. The cryogenic cooler of claim 1, wherein the dynamoelectric machine comprises a motor.

9. A reverse Brayton cycle cryogenic cooler for a dynamoelectric machine that has a superconducting rotor mounted on a dynamoelectric machine shaft and uses a working fluid to cool the rotor, comprising:

a cold side heat exchanger mounted proximate the rotor that receives the working fluid and transfers heat $Q_L$ from the rotor to the working fluid and discharges the working fluid at a low pressure $P_L$ into a cold side heat exchanger output path that extends within the dynamoelectric machine shaft;

a regenerator mounted within the dynamoelectric machine shaft that receives the low pressure working fluid from the cold side heat exchanger output path and warms the low pressure working fluid with warm working fluid that it receives from a warm side heat exchanger output path that extends within the dynamoelectric machine shaft and discharges the warmed low-pressure working fluid into a low-pressure regenerator output path that extends within the dynamoelectric machine shaft;

a compressor mounted within the dynamoelectric machine shaft that receives the warmed low-pressure working fluid from the low-pressure regenerator output path and compresses the working fluid to a high pressure $P_L$ at an elevated temperature and discharges the high-pressure working fluid at an elevated temperature into a compressor output path that extends within the dynamoelectric machine shaft;

a warm side heat exchanger mounted within the dynamoelectric machine shaft that receives the high-pressure working fluid at an elevated temperature from the compressor output path and transfers heat $Q_H$ from the working fluid to cooling air proximate the warm side heat exchanger and discharges the high-pressure cooled working fluid into the warm side heat exchanger output path, wherein the regenerator cools the high-pressure working fluid with the low-pressure working fluid that it receives from the cold side heat exchanger output path and discharges the cooler high pressure working fluid into a high-pressure regenerator output path that extends within the dynamoelectric machine shaft;

a turbine mounted within the dynamoelectric machine shaft that receives the cooler high pressure working fluid from the high-pressure regenerator output path to drive the compressor by way of a drive shaft that extends within the dynamoelectric machine shaft and to expand the working fluid to a lowest temperature at the low-pressure $P_L$ and discharges the lowest temperature low-pressure working fluid into a turbine discharge path that extends within the dynamoelectric machine shaft and supplies the cold side heat exchanger with working fluid; and a supplemental motor coupled to the drive shaft that also drives the compressor.

10. The cryogenic cooler of claim 9, wherein the cooler uses helium as the working fluid.

11. The cryogenic cooler of claim 9, wherein the supplemental motor comprises an electric motor.

12. The cryogenic cooler of claim 9, wherein the supplemental motor comprises an air turbine driven by the cooling air.

13. The cryogenic cooler of claim 9, wherein the dynamoelectric machine comprises a generator.

14. The cryogenic cooler of claim 9, wherein the dynamoelectric machine comprises a motor.

15. A reverse Brayton cycle cryogenic cooler for an electric generator that has a superconducting rotor mounted on a generator shaft and uses helium to cool the rotor, comprising:

a cold side heat exchanger mounted proximate the rotor that receives the helium and transfers heat $Q_L$ from the rotor to the helium and discharges the helium at a low pressure $P_L$ into a cold side heat exchanger output path that extends within the generator shaft;

a regenerator mounted within the generator shaft that receives the low pressure helium from the cold side heat exchanger output path and warms the low pressure helium with warm helium that it receives from a warm side heat exchanger output path that extends within the generator shaft and discharges the warmed low-pressure helium into a low-pressure regenerator output path that extends within the generator shaft;

a compressor mounted within the generator shaft that receives the warmed low-pressure helium from the low-pressure regenerator output path and compresses the helium to a high pressure $P_L$ at an elevated temperature and discharges the high-pressure helium at an elevated temperature into a compressor output path that extends within the generator shaft;

a warm side heat exchanger mounted within the generator shaft that receives the high-pressure helium at an elevated temperature from the compressor output path and transfers heat $Q_H$ from the helium to cooling air proximate the warm side heat exchanger and discharges the high-pressure cooled helium into the warm side heat exchanger output path, wherein the regenerator cools the high-pressure helium with the low-pressure helium that it receives from the cold side heat exchanger output path and discharges the cooler high pressure helium into a high-pressure regenerator output path that extends within the generator shaft;

a turbine mounted within the generator shaft that receives the cooler high pressure helium from the high-pressure regenerator output path to drive the compressor by way of a drive shaft that extends within the generator shaft and to expand the helium to a lowest temperature at the low-pressure $P_L$ and discharges the lowest temperature low-pressure helium into a turbine discharge path that extends within the generator shaft and supplies the cold side heat exchanger with helium; and a supplemental motor coupled to the drive shaft that also drives the compressor.

16. The cryogenic cooler of claim 15, wherein the supplemental motor comprises an electric motor.

17. The cryogenic cooler of claim 15, wherein the supplemental motor comprises an air turbine driven by the cooling air.

18. A reverse Brayton cycle cryogenic cooler for an electric motor that has a superconducting rotor mounted on a motor shaft and uses helium to cool the rotor, comprising:

a cold side heat exchanger mounted proximate the rotor that receives the helium and transfers heat $Q_L$ from the rotor to the helium and discharges the helium at a low pressure $P_L$ into a cold side heat exchanger output path that extends within the motor shaft;

a regenerator mounted within the generator shaft that receives the low pressure helium from the cold side heat exchanger output path and warms the low pressure helium with warm helium that it receives from a warm side heat exchanger output path that extends within the motor shaft and discharges the warmed low-pressure helium into a low-pressure regenerator output path that extends within the motor shaft;

a compressor mounted within the motor shaft that receives the warmed low-pressure helium from the low-pressure regenerator output path and compresses the helium to a high pressure $P_L$ at an elevated temperature and discharges the high-pressure helium at an elevated temperature into a compressor output path that extends within the motor shaft;

a warm side heat exchanger mounted within the motor shaft that receives the high-pressure helium at an elevated temperature from the compressor output path and transfers heat $Q_H$ from the helium to cooling air proximate the warm side heat exchanger and discharges the high-pressure cooled helium into the warm side heat exchanger output path, wherein the regenerator cools the high-pressure helium with the low-pressure helium that it receives from the cold side heat exchanger output path and discharges the cooler high pressure helium into a high-pressure regenerator output path that extends within the motor shaft;

a turbine mounted within the motor shaft that receives the cooler high pressure helium from the high-pressure regenerator output path to drive the compressor by way of a drive shaft that extends within the motor shaft and to expand the helium to a lowest temperature at the low-pressure $P_L$ and discharges the lowest temperature low-pressure helium into a turbine discharge path that extends within the motor shaft and supplies the cold side heat exchanger with helium; and a supplemental motor coupled to the drive shaft that also drives the compressor.

19. The cryogenic cooler of claim 18, wherein the supplemental motor comprises an electric motor.

20. The cryogenic cooler of claim 18, wherein the supplemental motor comprises an air turbine driven by the cooling air.

* * * * *